United States Patent [19]
Lee

[11] Patent Number: 6,098,026
[45] Date of Patent: Aug. 1, 2000

[54] METHOD OF TESTING PERFORMANCE OF SPINDLE MOTOR IN CD-ROM DRIVE

[75] Inventor: Ki-Ju Lee, Suwon, Rep. of Korea

[73] Assignee: SamSung Electronics Co., Ltd., Suwon, Rep. of Korea

[21] Appl. No.: 09/109,034

[22] Filed: Jul. 2, 1998

[30] Foreign Application Priority Data

Jul. 2, 1997 [KR] Rep. of Korea ................. 97-30656

[51] Int. Cl.$^7$ ................. G11B 27/00; G06F 11/00
[52] U.S. Cl. ................. 702/115; 702/176; 369/50; 369/53
[58] Field of Search ................. 702/115, 123, 702/176; 369/44.27, 44.29, 44.31, 44.34, 50, 53, 32

[56] References Cited

U.S. PATENT DOCUMENTS

| | | |
|---|---|---|
| 5,420,841 | 5/1995 | Hwang . |
| 5,466,999 | 11/1995 | Hutsell . |
| 5,477,522 | 12/1995 | Kim . |
| 5,545,989 | 8/1996 | Tian . |
| 5,612,845 | 3/1997 | Smith . |
| 5,617,339 | 4/1997 | Smith . |
| 5,621,710 | 4/1997 | Koo . |
| 5,673,242 | 9/1997 | Lin . |
| 5,706,265 | 1/1998 | Bang . |
| 5,726,958 | 3/1998 | Min . |
| 5,761,168 | 6/1998 | Kwon . |
| 5,809,007 | 9/1998 | Takemura et al. ................. 369/32 |
| 5,825,729 | 10/1998 | Ogasawara et al. ................. 369/44.27 |
| 5,870,363 | 2/1999 | Sun et al. ................. 369/50 |
| 5,926,449 | 7/1999 | Hiok et al. ................. 369/50 |
| 5,951,687 | 9/1999 | Chan et al. ................. 713/2 |
| 6,018,506 | 1/2000 | Okabe et al. ................. 369/32 |

*Primary Examiner*—Marc S. Hoff
*Assistant Examiner*—Bryan Bui
*Attorney, Agent, or Firm*—Robert E. Bushnell, Esq.

[57] ABSTRACT

A method of testing the durability and performance of a spindle motor in a CD-ROM drive includes the steps of (a) setting a test repetition number of rotation/halt operations of the spindle motor, and a test delay time; (b) executing a rotation/halt command of the spindle motor at a predetermined time interval, when a test command is input; (c) comparing the operation state of the spindle motor with the input command and determining whether an error has occurred, after the test delay time from the time when the rotation/halt command of the spindle motor was input;(d) providing a visual display of an error state, when an error has occurred at step (c); and (e) increasing the value of a counter and returning to step (b) if the counter value is less than the test repetition number, and providing a visual display of test completion if the counter value is not less than the test repetition number, when no error has occurred at step (c). As a result, testing time can be reduced, and the durability of only the spindle motor can be accurately tested.

12 Claims, 2 Drawing Sheets

METHOD OF TESTING PERFORMANCE OF SPINDLE MOTOR IN CD-ROM DRIVE

CLAIM FOR PRIORITY

This application makes reference to, incorporates the same herein, and claims all benefits accruing under 35 U.S.C. §119 from an application for METHOD OF TESTING PERFORMANCE OF SPINDLE MOTOR IN CD-ROM DRIVE earlier filed in the Korean Industrial Property Office on the $2^{nd}$ of July 1997, and there duly assigned Ser. No. 30656/1997, a copy of which application is annexed hereto.

BACKGROUND OF THE INVENTION

1. Technical Field

The present invention relates to a method of testing the performance of a CD-ROM drive, and more particularly, to a method of testing the performance of a spindle motor to test the durability of the spindle motor.

2. Related Art

A compact disc read-only-memory (CD-ROM) drive is an important peripheral unit of a computer system, and operates upon a compact disk which provides a large amount of data storage capacity. A spindle motor is necessary used to rotate the compact disk at speeds typically on the order of several thousand revolutions-per-minute to ensure high speed data access. Therefore, performance of the spindle motor is critical to providing a high level of data storage system performance and reliability. Any changes in the performance of the spindle motor must be detected early in its service life in order to minimize the probability of intermittent and catastrophic failure of the CD-ROM drive. There are a number of spindle motor predictive failure techniques for detecting degradation in spindle motor performance during the service life of the spindle motor such as disclosed in U.S. Pat. No. 5,612,845 for Method And Apparatus For In-Situ Detection Of Data Storage System Spindle Motor Performance Degradation, and U.S. Pat. No. 5,617,339 for Method And Apparatus For Detecting Degradation In Data Storage System Spindle Motor Performance both issued to Smith. In addition, the reading operation of CD-ROM drives may be tested in the manner disclosed by U.S. Pat. No. 5,761,168 for CD-ROM Drive Testing Method issued to Kwon and assigned to the instant assignee. However, there is no specific testing technique available for testing the durability of a spindle motor in a CD-ROM drive. Since there is no specific command for repeatedly rotating and halting only the spindle motor, the tray must be repeatedly moved in and out to test the durability of the spindle motor. That is, the durability of the spindle motor is normally tested by repeatedly rotating and halting the spindle motor. Consequently, the cycle of repetition of the rotation/halt operation of the spindle motor becomes longer, and problems associated with the quality of other components in the spindle motor assembly may occur. As a result, it has been difficult to test the durability of only the spindle motor in the CD-ROM drive.

SUMMARY OF THE INVENTION

Accordingly, it is therefore an object of the present invention to provide a method of testing the durability and performance of a spindle motor in a CD-ROM drive.

It is also an object to provide a method for testing the durability and performance of a spindle motor by repeatedly rotating and halting only the spindle motor and detecting the rotation state of the spindle motor.

These and other objects of the present invention can be achieved by a method of testing the durability of a spindle motor in a CD-ROM drive, comprising the steps of: (a) setting a test repetition number $N_{max}$ of rotation/halt operations of the spindle motor, and a test delay time T; (b) executing a rotation command and a halt command of the spindle motor at a predetermined time interval, when a command for testing the performance of the spindle motor is input; (c) comparing the operation state of the spindle motor with the input command and determining whether an error has occurred, after the test delay time T from the point when the rotation or halt command of the spindle motor was input; (d) providing a visual display of an error status, when an error has occurred at step (c); and (e) increasing the value of a counter and returning to step (b) if the counter value is less than the test repetition number $N_{max}$, and displaying completion of testing if the counter value is equal to or greater than the test repetition number $N_{max}$, when no error has occurred at step (c).

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 2:
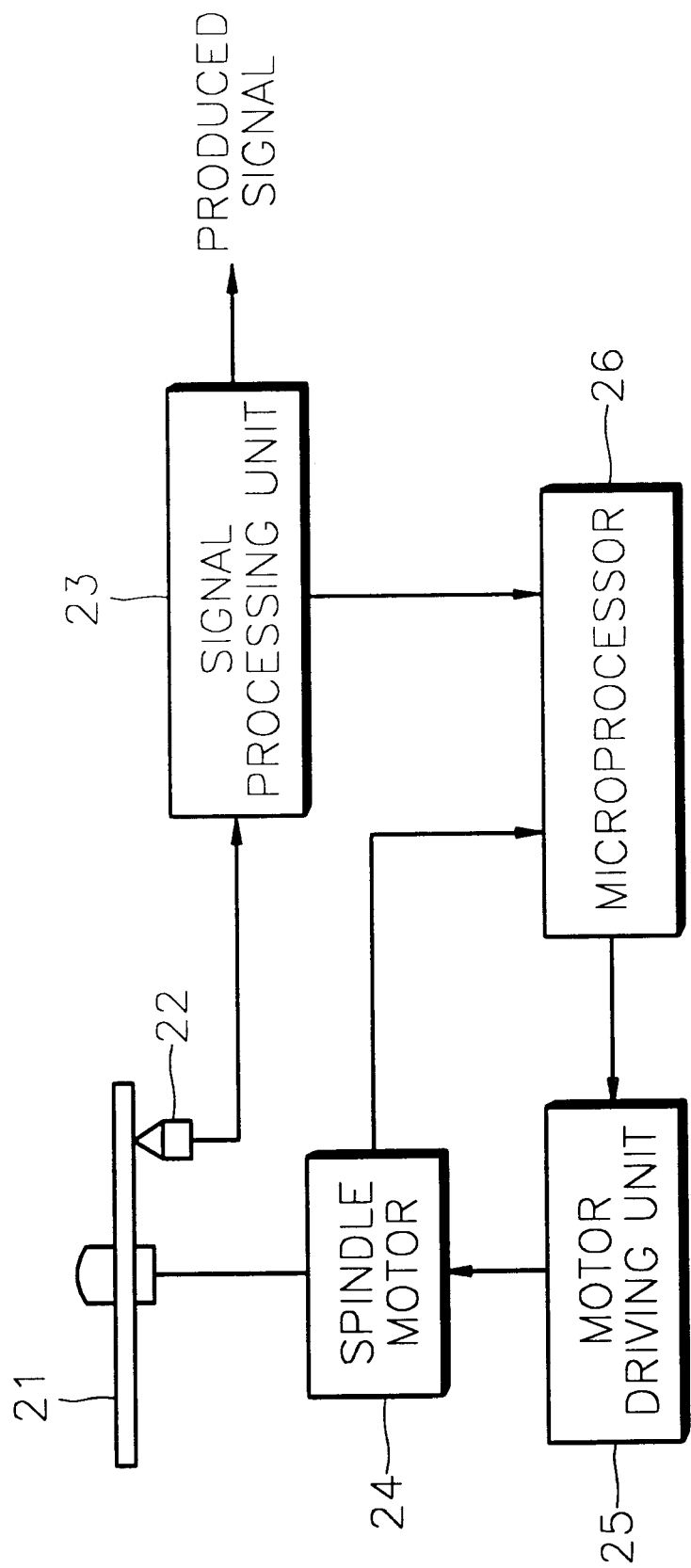
FIG. 2 is a block diagram of a CD-ROM drive for implementing a testing method according to a preferred embodiment of the present invention.

Referring now to the drawings and particularly to FIG. 2, which illustrates a CD-ROM drive for implementing a CD-ROM drive testing method according to a preferred embodiment of the present invention. As shown in FIG. 2, the CD-ROM drive includes a disk 21, a pick-up unit 22, a signal processing unit 23, a spindle motor 24, a motor driving unit 25 and a microprocessor 26. The spindle motor 24 rotates the disk 21 under the control of the motor driving unit 25. The pick-up unit 22 is used to reproduce data information recorded on the disk 21. The microprocessor 26 controls the overall operation of the CD-ROM drive, and the signal processing unit 23 is provided to transmit a predetermined signal from the pick-up unit 23 to the microprocessor 26 and to drive the spindle motor 24.

Figure 1:
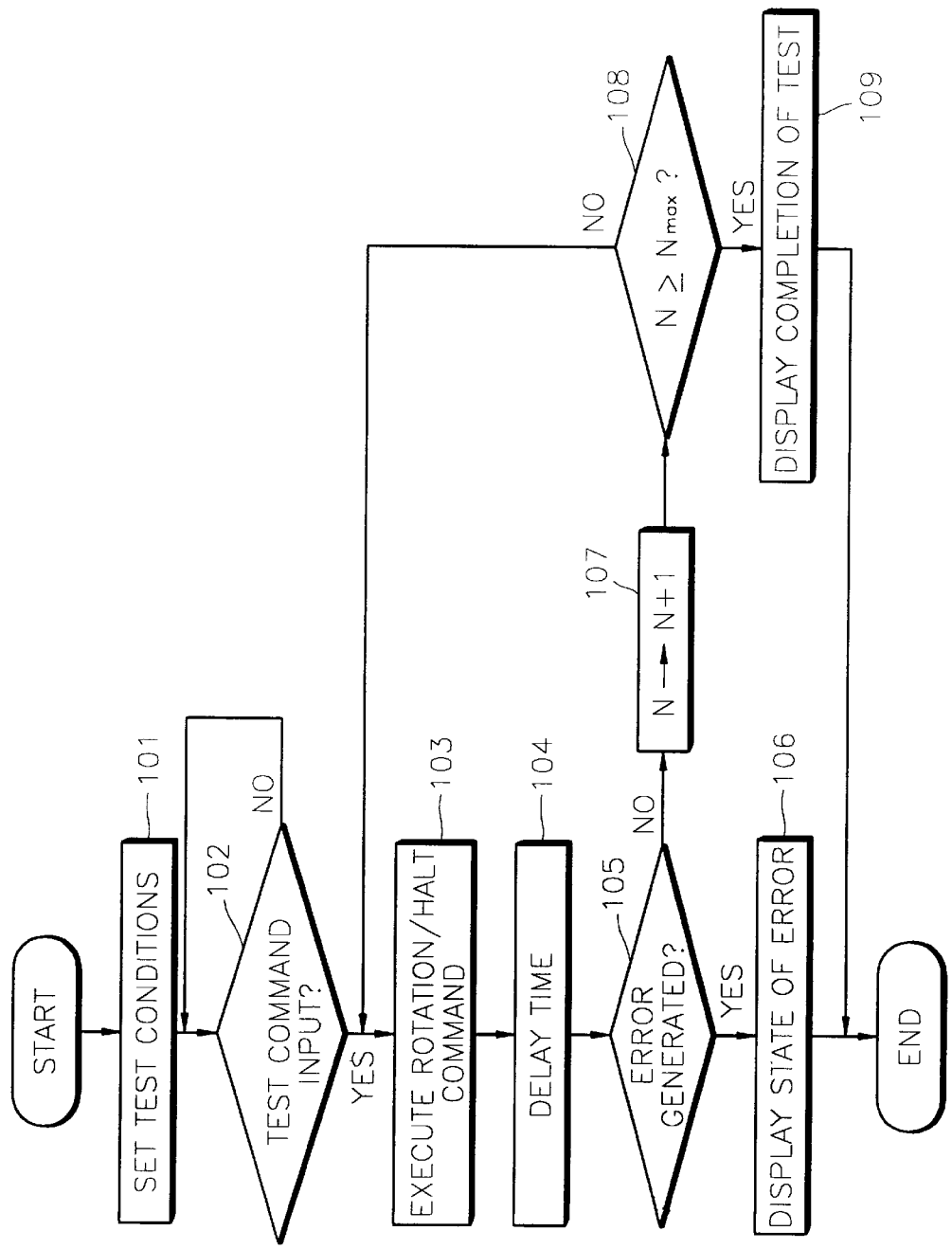
FIG. 1 is a flowchart illustrating a CD-ROM drive testing method for testing the durability of a spindle motor in a CD-ROM drive according to the preferred embodiment of the present invention.

Refer now to FIG. 1 which illustrates a CD-ROM drive testing method for testing the durability of a spindle motor implemented by the CD-ROM drive as shown in FIG. 2. The steps as shown in the flowchart are performed in or controlled by the microprocessor 26 of the CD-ROM drive shown in FIG. 2. Now, each of the steps will be described in detail with reference to FIG. 1 as follows.

In step 101, test values necessary to test the durability of the spindle motor 24 are set, and the set values are stored in an internal memory of the microprocessor 26. The initial set values correspond to test conditions, and include a test repetition number $N_{max}$ of rotation/halt cycles of the spindle motor 24, an execution length of a rotation/halt mode thereof, and a test delay time T set by a user.

In step 102, after the test conditions of the spindle motor 24 are set at step 101, the microprocessor 26 determines whether a spindle motor performance test command indicating a test start is input via an external input device such as a keyboard.

In step 103, when the performance test command of the spindle motor 24 is input to the microprocessor 26, the microprocessor 26 applies a rotation command for rotating the spindle motor 24 to the motor driving unit 25, and thus the motor driving unit 25 drives the spindle motor 24 by generating a driving voltage. After a lapse of time corresponding to the execution length of the initially-set rotation mode, the microprocessor 26 applies a halt command to the motor driving unit 25 to halt the spindle motor 24. That is, the microprocessor 26 must wait for the "execution length" before the halt command is applied to the motor driving unit 25 to halt the rotation of the spindle motor 24. The time required for executing the rotation/halt operation permits the microprocessor 26 to check whether the spindle motor 24 operates normally in response to an input command (i.e., a rotation command and a halt command). In addition, the halt command may be applied first to the motor driving unit 25 instead of the rotation command for testing purposes.

In step 104, the test is then delayed by the test delay time T from the point when the rotation or halt command is applied from the microprocessor 26, to the time when the spindle motor 24 should normally react to the input command. The test delay time T is generally set for a few milliseconds which corresponds to the time between the point at which the microprocessor 26 generates a rotation/halt command and the point at which the spindle motor 24 reaches a target speed in response to the input command. This is because each type of spindle motor 24 has a different rotation characteristic and requires a few microseconds to begin rotation in response to a rotation command, and another few microseconds to reach a target speed.

In step 105, after the test is delayed by the test delay time T, the microprocessor 26 determines whether an error is generated, by analyzing data, input to the signal processing unit 23 via the pickup 22 and processed therein, and a frequency generator (FG) signal generated by the spindle motor.

In this situation, occurrence or non-occurrence of an error is determined according to whether the spindle motor 24 operates as specified by the input command. That is, when the spindle motor 24 operates as specified by the input command, no error will occur. However, when the spindle motor 24 operates differently from the specification of the input command, the microprocessor 26 determines that an error occurs. An example of error generation is when the rotation command is input to the spindle motor 24, but the spindle motor 24 does not rotate. In addition, when the spindle motor 24 operates differently from the input command, the error status can be determined in detail. For instance, when the rotation command is input, the spindle motor 24 may react slowly to the input command, or not rotate at all.

The input command can be found out by analyzing an ATAPI code of a table set in the memory of the microprocessor 26. The ATAPI code is a specific type of code used for data communication between the microprocessor of a CD-ROM drive and an external personal computer. The operation state of the spindle motor 24 can be determined using a frequency generator (FG) which is a rotation sensor attached to the spindle motor 24.

In step 106, if the microprocessor 26 determines that an error has occurred, error information is displayed via a display unit (not shown). According to the state of the error, the rotation delay error or non-rotation error of the spindle motor 24 is displayed. In particular, the number of rotation/halt repetitions of the spindle motor 24 until the error which has occurred is read from a built-in counter of the microprocessor 26, and displayed via a display unit (not shown).

In step 107, if the microprocessor 26 determines that no error has occurred, the value of the counter built into the microprocessor 26 is incremented by one to indicate that one cycle of the rotation/halt command of the spindle motor 24 was executed. In step 108, the count value N of the counter built into the microprocessor 26 is compared with the test repetition number $N_{max}$ of rotation/halt operations of the spindle motor 24 which is set at step 101. That is, when the count value N of the counter is smaller than the test repetition number $N_{max}$, it corresponds to the case where the count value N has not exceeded the repetition test number of the spindle motor 24, and thus the test procedure returns to step 103 to repeat the above steps again.

When the count value N of the counter is equal to or larger than the test repetition number $N_{max}$ at step 108, information is displayed indicating that no abnormalities were generated while the spindle motor 24 was repeatedly rotated/halted a predetermined number of times. Then, the test of the durability of the spindle motor 24 is completed.

As described above, the test of performance of the spindle motor in the CD-ROM drive can be quickly and accurately performed though the above-described steps. Error is detected by repeatedly rotating and halting only the spindle motor, without operating mechanisms other than the spindle motor. Therefore, testing time is reduced, and the durability of only the spindle motor can be accurately tested.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method of testing durability and performance of a spindle motor in a compact disc read-only-memory (CD-ROM) drive, comprising the steps of:

(a) setting a test repetition number of rotation/halt operations of the spindle motor, and a test delay time;

(b) executing a rotation/halt command of the spindle motor at a predetermined time interval, when a test command is input;

(c) comparing the operation state of the spindle motor with the input command and determining whether an error has occurred, after the test delay time from the time when the rotation/halt command of the spindle motor was input;

(d) providing a visual display of an error state, when an error has occurred at step (c); and (e) increasing the value of a counter and returning to step (b) if the counter value is less than the test repetition number, and providing a visual display of test completion if the counter value is not less than the test repetition number, when no error has occurred at step (c).

2. The method of claim 1, wherein in step (d), the state of error is classified and displayed as a rotation delay error or a non-rotation error, according to the result of the determination at step (c).

3. The method of claim 1, wherein in step (d), the state of error of the spindle motor is displayed, and the number of repetitions of rotation/halt of the spindle motor until the error has occurred, determined by the counter value, is displayed.

4. The method of claim 1, wherein the test delay time at step (a) is set to be at least as long as the time between when said rotation/halt command is input and when the spindle motor responds normally to the input command.

5. A method of testing performance of a spindle motor in a compact disc read-only-memory (CD-ROM) drive, comprising the steps of:

permitting a user to set a test condition for testing the performance of the spindle motor, including a test repetition number of rotation/halt operations of the spindle motor, an execution length of an initial rotation, and a test delay time;

determining whether a test command for testing the performance of the spindle motor is initiated via a keyboard;

when the test command is initiated, applying a rotation command to rotate the spindle motor, and then applying a halt command to halt rotation of the spindle motor after a lapse of time corresponding to the execution length of the initially set rotation;

determining whether the spindle motor operates as specified by the applied command upon expiration of the test delay time set by the user;

providing a visual display of an error status of the spindle motor, when the spindle motor operates differently from that specified by the applied command;

increasing the value of a counter and returning to application of the rotation command and the halt command, when a counter value is less than the test repetition number set by the user; and providing a visual display of a test completion, when the counter value is not less than the test repetition number set by the user.

6. The method of claim 5, wherein the error status of the spindle motor is classified as one of a rotation delay error and a non-rotation error.

7. The method of claim 5, wherein the error status of the spindle motor and the test repetition number of rotation/halt operations of the spindle motor number are displayed to inform the user of the test result.

8. The method of claim 5, wherein the test delay time is set to be at least as long as the time between when one of the rotation command and the halt command is input and when the spindle motor responds normally to the input command.

9. A compact disc read-only-memory (CD-ROM) drive system, comprising:

a compact disc;

a spindle motor for rotating the compact disc;

a motor driver for driving the spindle motor;

a microprocessor for testing performance of the spindle motor by:

permitting a user to set a test condition for testing the performance of the spindle motor, including a test repetition number of rotation/halt operations of the spindle motor, an execution length of an initial rotation, and a test delay time;

determining whether a test command for testing the performance of the spindle motor is initiated via a keyboard;

when the test command is initiated, applying a rotation command to the motor driver to rotate the spindle motor, and then applying a halt command to the motor driver to halt rotation of the spindle motor after a lapse of time corresponding to the execution length of the initially set rotation;

determining whether the spindle motor operates as specified by the applied command upon expiration of the test delay time set by the user;

providing a visual display of an error status of the spindle motor, when the spindle motor operates differently from that specified by the applied command;

increasing the value of an internal counter and returning to application of the rotation command and the halt command, when a counter value is less than the test repetition number set by the user; and providing a visual display of a test completion, when the counter value is not less than the test repetition number set by the user.

10. The compact disc read-only-memory (CD-ROM) drive system of claim 9, wherein the error status of the spindle motor is classified as one of a rotation delay error and a non-rotation error.

11. The compact disc read-only-memory (CD-ROM) drive system of claim 10, wherein the error status of the spindle motor and the test repetition number of rotation/halt operations of the spindle motor number are displayed to inform the user of the test result.

12. The compact disc read-only-memory (CD-ROM) drive system of claim 11, wherein the test delay time is set to be at least as long as the time between when one of the rotation command and the halt command is input and when the spindle motor responds normally to the input command.

* * * * *